J. HOUPT.
FEED PUMP FOR STEAM BOILERS.
No. 10,177. Reissued Aug. 8, 1882.
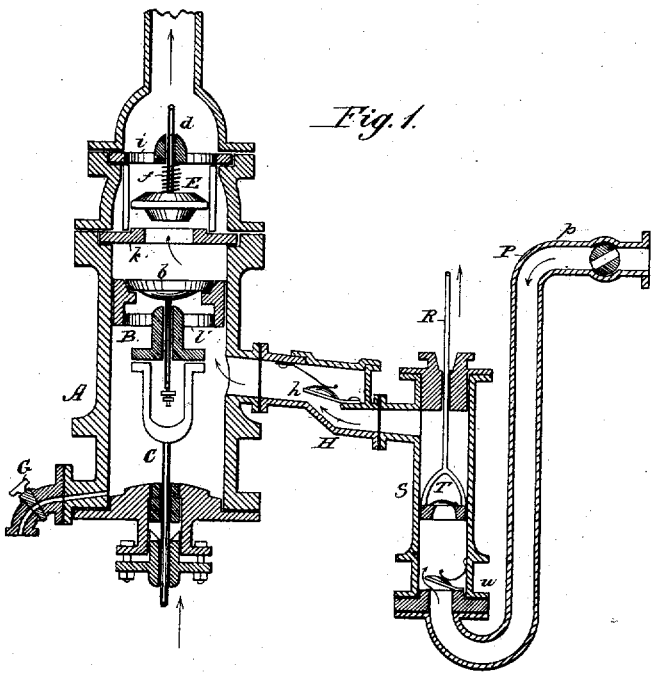
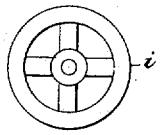
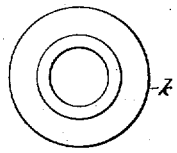
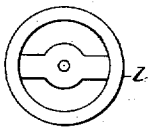
WITNESSES:
W. W. Hollingsworth
John C. Kenon
INVENTOR:
J. Houpt
BY
ATTORNEYS.
N. PETERS, Photo-Lithographer, Washington, D. C.

UNITED STATES PATENT OFFICE.

JOHN HOUPT, OF SPRINGTOWN, PENNSYLVANIA.

FEED-PUMP FOR STEAM-BOILERS.

SPECIFICATION forming part of Reissued Letters Patent No. 10,177, dated August 8, 1882.

Original No. 254,321, dated February 28, 1882. Application for reissue filed July 8, 1882.

*To all whom it may concern:*

Be it known that I, JOHN HOUPT, of Springtown, in Bucks county, and State of Pennsylvania, have invented a new and useful Improvement in Hot-Water-Feed Pumps for Steam-Boilers; and I do hereby declare that the following is a full, clear, and exact description of the same, reference being had to the accompanying drawings, forming a part of this specification, in which—

Figure 1 is a sectional elevation of the pump. Figs. 2, 3, and 4 are plan views of certain parts that will be hereinafter referred to.

The object of my invention is to provide an improved pump for supplying steam-boilers with hot water at a higher temperature and with greater uniformity of pressure than is practicable with feed-pumps of ordinary construction, thus economizing fuel and tending to prevent explosions due to the water becoming low therein in consequence of defective working of the hot-water-feed pumps, which is most liable to occur when the water accidentally attains a very high temperature in the heaters, more especially the heaters of high-pressure engines.

The invention is embodied in the construction and combination of parts, which I will now proceed to describe.

The vertical pump-cylinder A is provided with a piston, B, reciprocated by piston-rod C, attached to a crank-shaft or cross-head. (Not shown.) Said piston B is annular in form, and a relief-valve, *b*, is seated downward therein, the same being guided in its vertical movement by means of a pendent stem, as shown.

In the upper portion of the cylinder A is located the outlet or discharge valve E, which seats downward, and has a vertical guide-stem, *d*, around which is coiled a spiral spring, *f*. The function of the latter is to press down the valve E promptly at the moment when the piston B reaches the limit of its upward stroke.

A cock, G, is provided for use in drawing off the water from the cylinder when the pump is not in operation.

The letter H indicates the hot-water-supplying pipe, having a check-valve, *h*, its location being thus intermediate of the feed-pump (whose parts have been above described) and the feed-water heater (not shown) or other source of supply. Between such heater and valve *h*, I place an auxiliary force-pump, whose cylinder S is a continuation of the said tube H. The piston T is reciprocated simultaneously with the piston B and in the same direction. At the bottom of the cylinder S is a check-valve, *u*. A tube, P, having gage-cock *p*, connects this auxiliary pump S T *u* with the heater or source of supply, (not shown,) which is in practice located above the level of the pump-cylinder A, so that the pump will be always primed and supplied by the gravitation of the feed-water itself, independent of the pressure of the atmosphere.

Figs. 2, 3, and 4 are plan views, respectively, of the guide *i* for discharge-valve E, the seat K for said valve, and the lower part, *l*, of the piston B. Since both pistons B T reciprocate together and in the same direction, the piston B forces a charge of hot water, steam, &c., past the outlet-valve E at one end of the cylinder A, the piston T of the auxiliary feed-pump S at the same time forcing the next charge of hot water past check-valve *h* in pipe H into the other end of the cylinder A, thus affording good and uniform charges or supplies of hot water to the pump-cylinder A. At the limit of its upward movement the piston B comes in close contact with the seat of valve E, and before the piston begins its reverse movement the said valve E closes, and hence as the piston continues to recede a partial vacuum is for an instant formed between it and the discharge-valve seat, which aids in overcoming the inertia of the relief-valve *b* of said piston, so that water and steam pass upward and fill such vacuum more quickly than would be otherwise possible. The vacuum therefore aids in raising water and steam above the piston B, and relieves the pump of labor to that extent. The artificial pulsation thus produced overcomes any undue back-pressure that may arise from the formation of steam in the pump-cylinder and supply-pipes, owing to the high temperature attained by the surrounding materials. It is hence practicable to supply a steam-boiler with water of higher temperature than by means of the ordinary feed-pump, since there is greatly less danger of explosion from the rapid formation of steam in the cylinder and supply-pipes.

Having thus described my invention, what I claim, and desire to secure by Letters Patent, is—

1. In a pump for feeding hot water to steam-boilers, the combination of the cylinder A, piston B, the latter having the relief-valve *b*, the spring check-valve *h* in the supply-pipe, and the outlet-valve in the discharge end of said cylinder, all arranged to operate as shown and described.

2. In a pump for feeding hot water to steam-boilers, the combination, with cylinder A, piston B *b*, and outlet and check valves, of the auxiliary feed-pump consisting of cylinder S, valved piston T, and valve *u*, all as shown and described, to operate as hereinbefore specified, to produce an artificial pulsation and overcome any undue back-pressure in the cylinder and supply-pipes.

JOHN HOUPT.

Witnesses:
ELI I. SAEGER,
GEO. W. STUCKERT.